US010962690B2

(12) United States Patent
Fujino

(10) Patent No.: US 10,962,690 B2
(45) Date of Patent: Mar. 30, 2021

(54) OPTICAL FILM AND PRODUCTION METHOD THEREFOR, AND POLARIZING PLATE

(71) Applicant: ZEON CORPORATION, Tokyo (JP)

(72) Inventor: Yasuhide Fujino, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 210 days.

(21) Appl. No.: 16/332,140

(22) PCT Filed: Sep. 5, 2017

(86) PCT No.: PCT/JP2017/031903
§ 371 (c)(1),
(2) Date: Mar. 11, 2019

(87) PCT Pub. No.: WO2018/061648
PCT Pub. Date: Apr. 5, 2018

(65) Prior Publication Data
US 2019/0361152 A1    Nov. 28, 2019

(30) Foreign Application Priority Data

Sep. 30, 2016 (JP) ............................. JP2016-192902

(51) Int. Cl.
| | | |
|---|---|---|
| G02B 5/30 | (2006.01) | |
| G02B 1/14 | (2015.01) | |
| B29D 11/00 | (2006.01) | |
| C08F 297/04 | (2006.01) | |
| C08J 5/18 | (2006.01) | |
| B29K 25/00 | (2006.01) | |
| B29K 96/04 | (2006.01) | |
| B29K 105/00 | (2006.01) | |
| G02F 1/1335 | (2006.01) | |
| G02F 1/13363 | (2006.01) | |

(52) U.S. Cl.
CPC .......... *G02B 1/14* (2015.01); *B29D 11/00644* (2013.01); *C08F 297/046* (2013.01); *C08J 5/18* (2013.01); *G02B 5/3083* (2013.01); *B29K 2025/08* (2013.01); *B29K 2096/04* (2013.01); *B29K 2105/0085* (2013.01); *C08F 2810/50* (2013.01); *C08J 2353/02* (2013.01); *G02F 1/13363* (2013.01); *G02F 1/133528* (2013.01)

(58) Field of Classification Search
CPC .......... G02B 1/14; G02B 5/3083; G02B 1/00; G02B 1/04; G02B 1/08; G02B 5/3025; B29D 11/00644; B29D 11/0073; C08F 297/046; C08F 297/281; C08F 297/50; C08J 5/18; C08J 2353/02; B29K 2025/08; B29K 2096/04; B29K 2105/0085; G02F 1/133528; G02F 1/13363; G02F 2001/133635; G02F 2001/133637; G02F 2001/133638
USPC ........... 359/489.07, 489.01; 349/84, 96, 117, 349/118, 119; 362/19; 353/20
See application file for complete search history.

(56) References Cited

U.S. PATENT DOCUMENTS

| 7,851,068 B2 * | 12/2010 | Kawamoto | ....... G02F 1/133634 428/500 |
|---|---|---|---|
| 2007/0092663 A1 * | 4/2007 | Murakami | ................ C08L 1/10 428/1.31 |
| 2013/0216733 A1 * | 8/2013 | Sasata | ............... G02F 1/133528 428/1.31 |
| 2014/0071379 A1 * | 3/2014 | Takahashi | ............ G02B 5/3083 349/62 |

FOREIGN PATENT DOCUMENTS

| JP | 2006030937 A | 2/2006 |
|---|---|---|
| JP | 2006221155 A | 8/2006 |
| JP | 2009235249 A | 10/2009 |
| JP | 2011013378 A | 1/2011 |
| JP | 2012215687 A | 11/2012 |
| WO | 2014057938 A1 | 4/2014 |

OTHER PUBLICATIONS

Dec. 5, 2017, International Search Report issued in the International Patent Application No. PCT/JP2017/031903.
Apr. 2, 2019, International Preliminary Report on Patentability issued in the International Patent Application No. PCT/JP2017/031903.

* cited by examiner

*Primary Examiner* — Arnel C Lavarias
(74) *Attorney, Agent, or Firm* — Kenja IP Law PC

(57) ABSTRACT

An optical film, wherein a photoelastic coefficient thereof is $1.5 \times 10^{-13}$ $(\text{dyn/cm}^2)^{-1}$ or less, an in-plane retardation Re(560) thereof at a wavelength of 560 nm is 1.0 nm or less, an absolute value of a thickness-direction retardation Rth (560) thereof at a wavelength of 560 nm |Rth(560)| is 1.0 nm or less, a change of a ratio Re(560)/d that is a ratio of the in-plane retardation Re(560) at a wavelength of 560 nm relative to a thickness d, the change being a result of storage at a temperature of 60° C. and a humidity of 90% for 4 hours, is $0.5 \times 10^{-5}$ or less, and a change of a ratio Rth(560)/d that is a ratio of the thickness-direction retardation Rth(560) at a wavelength of 560 nm relative to the thickness d, the change being a result of storage at a temperature of 60° C. and a humidity of 90% for 4 hours, is $0.5 \times 10^{-5}$ or less.

10 Claims, No Drawings

OPTICAL FILM AND PRODUCTION METHOD THEREFOR, AND POLARIZING PLATE

FIELD

The present invention relates to an optical film and a method for producing the same, and a polarizing plate including the optical film.

BACKGROUND

A polarizing plate generally includes a polarizer and a polarizer protective film. A resin film is usually used as the polarizer protective film (see Patent Literature 1).

CITATION LIST

Patent Literature

Patent Literature 1: Japanese Patent Application Laid-Open No. 2011-013378 A

SUMMARY

Technical Problem

The polarizing plate provided in a liquid crystal display device usually includes the polarizer protective films on both sides of the polarizer. Of these polarizer protective films, an inner polarizer protective film provided on a liquid crystal cell side of the polarizer is required to have a small change in retardation caused by a stress, and thus, required to have a small photoelastic coefficient. Further, the inner polarizer protective film is required to have a small absolute value of retardation. Further, the inner polarizer protective film is required to have a small change in retardation in a high temperature and high humidity environment. However, an optical film usable as the inner polarizer protective film that meets such requirements has yet to be achieved.

The present invention has been devised in view of the aforementioned problems and an object of the present invention is to provide: an optical film having a small photoelastic coefficient, a small absolute value of a retardation, and a small change in retardation in a high temperature and high humidity environment, and a method for producing the same; and a polarizing plate that includes the optical film.

Solution to Problem

<1> An optical film, wherein
a photoelastic coefficient thereof is $1.5 \times 10^{-13}$ $(dyn/cm^2)^{-1}$ or less,
an in-plane retardation Re(560) thereof at a wavelength of 560 nm is 1.0 nm or less,
an absolute value of a thickness-direction retardation Rth(560) thereof at a wavelength of 560 nm |Rth(560)| is 1.0 nm or less,
a change of a ratio Re(560)/d that is a ratio of the in-plane retardation Re(560) at a wavelength of 560 nm relative to a thickness d, the change being a result of storage at a temperature of 60° C. and a humidity of 90% for 4 hours, is $0.5 \times 10^{-5}$ or less, and
a change of a ratio Rth(560)/d that is a ratio of the thickness-direction retardation Rth(560) at a wavelength of 560 nm relative to the thickness d, the change being a result of storage at a temperature of 60° C. and a humidity of 90% for 4 hours, is $0.5 \times 10^{-5}$ or less.

<2> The optical film according to <1>, wherein
an in-plane retardation Re(450) of the optical film at a wavelength of 450 nm, the in-plane retardation Re(560) of the optical film at a wavelength of 560 nm, and an in-plane retardation Re(650) of the optical film at a wavelength of 650 nm satisfy following formula (i) and formula (ii):

$$Re(450)/Re(560)<1.0 \qquad (i), \text{ and}$$

$$Re(650)/Re(560)>1.0 \qquad (ii).$$

<3> The optical film according to <1> or <2>, comprising a polymer having an aromatic vinyl compound hydrogenated product unit (a) and a diene compound hydrogenated product unit (b).

<4> The optical film according to <3>, wherein
the polymer is a triblock copolymer including
one block B per molecule having the diene compound hydrogenated product unit (b),
one block A1 per molecule connected to one end of the block B and having the aromatic vinyl compound hydrogenated product unit (a), and
one block A2 per molecule connected to the other end of the block B and having the aromatic vinyl compound hydrogenated product unit (a).

<5> The optical film according to <4>, wherein
in the triblock copolymer, a weight ratio (A1+A2)/B that is a ratio of the total of the block A1 and the block A2 relative to the block B is 70/30 or more and 90/10 or less, and
in the triblock copolymer, a weight ratio A1/A2 that is a ratio of the block A1 relative to the block A2 is 5 or more and 8 or less.

<6> The optical film according to any one of <3> to <5>, wherein
the aromatic vinyl compound hydrogenated product unit (a) is a structural unit having a structure obtained by polymerizing and hydrogenating styrene, and
the diene compound hydrogenated product unit (b) is a structural unit having a structure obtained by polymerizing and hydrogenating isoprene.

<7> The optical film according to any one of <3> to <6>, wherein
a weight-average molecular weight of the polymer is 50,000 or more and 80,000 or less, and
a molecular weight distribution of the polymer is 2 or less.

<8> A polarizing plate comprising a polarizer and the optical film according to any one of <1> to <7>.

<9> A method for producing the optical film according to any one of <1> to <7>, comprising
performing melt extrusion molding of a resin in a temperature range of 180° C. to 260° C., the resin containing a polymer having an aromatic vinyl compound hydrogenated product unit (a) and a diene compound hydrogenated product unit (b).

<10> The method for producing the optical film according to <9>, comprising stretching a pre-stretch film in a temperature range of 130° C. to 180° C. at a stretching ratio of 1.1 times to 2.5 times, the pre-stretch film being a film obtained by the melt extrusion molding.

Advantageous Effects of Invention

According to the present invention, an optical film having a small photoelastic coefficient, a small absolute value of a retardation, and a small change in retardation in a high temperature and high humidity environment, and a method for producing the same; and a polarizing plate that includes the optical film can be provided.

DESCRIPTION OF EMBODIMENTS

Hereinafter, the present invention will be described in detail with reference to embodiments and examples. However, the present invention is not limited to the following embodiments and examples, and may be freely modified for implementation without departing from the scope of claims of the present invention and the scope of their equivalents.

In the following description, an in-plane retardation Re of a film is a value represented by Re=(nx−ny)×d, unless otherwise specified. A thickness-direction retardation Rth of a film is a value represented by Rth={(nx+ny)/2−nz}, unless otherwise specified. Herein, nx represents a refractive index in a direction in which the maximum refractive index is given among directions perpendicular to the thickness direction of the film (in-plane directions), ny represents a refractive index in a direction, among the above-mentioned in-plane directions of the film, orthogonal to the direction giving nx, nz represents a refractive index in the thickness direction of the film, and d represents the thickness of the film. The measurement wavelength of the retardation is 590 nm unless otherwise specified.

In the following description, a "polarizing plate" includes not only a rigid member but also a flexible member such as a resin film unless otherwise specified.

In the following description, a "long-length" film refers to a film with the length that is 5 times or more the width, and preferably a film with the length that is 10 times or more the width, and specifically refers to a film having a length that allows a film to be wound up into a rolled shape for storage or transportation. The upper limit of the length of the long-length film is not particularly limited, and is, for example, 100,000 times or less the width.

[1. Summary of Optical Film]

The optical film of the present invention has a small photoelastic coefficient. Specifically, the photoelastic coefficient of the aforementioned optical film is usually $1.5 \times 10^{-13}$ $(dyn/cm^2)^{-1}$ or less, preferably $1.48 \times 10^{-13}$ $(dyn/cm^2)^{-1}$ or less, and more preferably $1.46 \times 10^{-13}$ $(dyn/cm^2)^{-1}$ or less. The lower limit of the photoelastic coefficient is preferably as small as possible, and it is ideally $0.0 \times 10^{-13}$ $(dyn/cm^2)^1$. The optical film having such a small photoelastic coefficient has low tendency to cause a large retardation change due to stress at the time of bonding to a polarizer. Thus, a liquid crystal display device with reduced color unevenness can be achieved.

The photoelastic coefficient of the optical film may be measured by the following method.

The optical film is cut out in a size of 100 mm×10 mm to obtain a test piece. To the test piece thus obtained, a load of 0 gram-weight, 100 gram-weight, 200 gram-weight, 300 gram-weight, 400 gram-weight, and 500 gram-weight is applied, and an in-plane retardation with the load is measured. The measurement of the aforementioned in-plane retardation is performed at a measurement wavelength of 560 nm using an ellipsometer. The photoelastic coefficient may be derived by calculating a stress as a load per cross-sectional area of the film while defining a thickness of the optical film as d, and calculating a change rate of Re(560)/d, representing a ratio of an in-plane retardation Re(560) relative to the thickness d, with respect to the stress.

The optical film of the present invention has a small absolute value of a retardation. Specifically, the in-plane retardation Re(560) of the optical film at a wavelength of 560 nm is usually 1.0 nm or less, preferably 0.8 nm or less, particularly preferably 0.6 nm or less, and ideally 0 nm. Further, |Rth(560)|, i.e., an absolute value of a thickness-direction retardation Rth(560) of the optical film at a wavelength of 560 nm, is usually 1.0 nm or less, preferably 0.8 nm or less, particularly preferably 0.6 nm or less, and ideally 0 nm. When the optical film having such a small absolute value of retardation is provided in a polarizing plate as an inner polarizer protective film, occurrence of color unevenness can be prevented in a liquid crystal display device that includes such a polarizing plate.

The in-plane retardation Re and the thickness-direction retardation Rth of the film may be measured using a phase difference meter ("AXOScan" manufactured by Axometrics, Inc.).

The optical film of the present invention has a small change in retardation in a high temperature and high humidity environment. Specifically, a change of the ratio Re(560)/d that is a ratio of the in-plane retardation Re(560) of the optical film measured at a wavelength of 560 nm relative to the thickness d thereof, the change being the result of storage at a temperature of 60° C. and a humidity of 90% for 4 hours, is usually $0.5 \times 10^{-5}$ or less, preferably $0.2 \times 10^{-5}$ or less, and more preferably $0.1 \times 10^{-5}$ or less, and is preferably $-0.5 \times 10^{-5}$ or more, more preferably $-0.2 \times 10^{-5}$ or more, and particularly preferably $-0.1 \times 10^{-5}$ or more. Further, a change of a ratio Rth(560)/d that is a ratio of the thickness-direction retardation Rth(560) of the optical film measured at a wavelength of 560 nm relative to the thickness d thereof, the change being the result of storage at a temperature of 60° C. and a humidity of 90% for 4 hours, is usually $0.5 \times 10^{-5}$ or less, preferably $0.2 \times 10^{-5}$ or less, and more preferably $0.1 \times 10^{-5}$ or less, and is preferably $-0.5 \times 10^{-5}$ or more, more preferably $-0.2 \times 10^{-5}$ or more, and particularly preferably $-0.1 \times 10^{-5}$ or more. The optical film having such a small change in retardation in a high temperature environment has excellent heat resistance and can be used in a high temperature environment. Further, when such an optical film is provided in the polarizing plate as the inner polarizer protective film, occurrence of color unevenness can be prevented in a liquid crystal display device that includes such a polarizing plate in a high temperature environment and in a high humidity environment.

The change of the ratio Re(560)/d and the change of the ratio Rth(560)/d described above may be measured by the following method.

The in-plane retardation and the thickness-direction retardation of the optical film are measured at a measurement wavelength of 560 nm. These values thus measured are referred to as an initial in-plane retardation Re0 and an initial thickness-direction retardation Rth0.

The aforementioned optical film is then stored at a temperature of 60° C. and a humidity of 90% for 4 hours.

The in-plane retardation and the thickness-direction retardation of the optical film after being stored are measured at a measurement wavelength of 560 nm. These values thus measured are referred to as a post-test in-plane retardation Re1 and a post-test thickness-direction retardation Rth1.

Subsequently, a change $\Delta Re(560)/d$ of the ratio Re(560)/d and a change $\Delta Rth(560)/d$ of the ratio Rth(560)/d are calculated by the following formula (X1) and formula (X2).

$$\Delta Re(560)/d = (Re1 - Re0)/d \qquad (X1)$$

$$\Delta Rth(560)/d = (Rth1 - Rth0)/d \qquad (X2)$$

The in-plane retardation Re(450) of the optical film at a wavelength of 450 nm, the in-plane retardation Re(560) of the optical film at a wavelength of 560 nm, and the in-plane retardation Re(650) of the optical film at a wavelength of 650 nm preferably satisfy the following formula (i) and formula (ii).

$$Re(450)/Re(560)<1.0 \qquad (i)$$

$$Re(650)/Re(560)>1.0 \qquad (ii)$$

When the optical film has the in-plane retardation Re(450), Re(560), and Re(650) that satisfy the formula (i) and formula (ii) described above, such an optical film usually has a property of showing a larger in-plane retardation as a wavelength becomes longer (hereinafter also referred to as "reverse wavelength distribution property" as necessary). When the optical film having the reverse wavelength distribution property is provided in the polarizing plate as the inner polarizer protective film, occurrence of light leakage and color unevenness at an oblique viewing angle can be prevented in a liquid crystal display device that includes such a polarizing plate. The light leakage at an oblique viewing angle described herein refers to light leakage that may be visually confirmed when a screen of the liquid crystal display device is viewed from an oblique direction that is neither parallel nor orthogonal to the screen.

The optical film having the various properties described above may be obtained by adopting a resin that includes a polymer X described below as a material.

[2. Aromatic Vinyl Compound Hydrogenated Product Unit (a) and Diene Compound Hydrogenated Product Unit (b)]

The optical film of the present invention preferably contains a polymer having an aromatic vinyl compound hydrogenated product unit (a) and a diene compound hydrogenated product unit (b). In the following description, such a specific polymer may be referred to as a "polymer X". Specifically, the optical film of the present invention may be a film formed of a resin containing the polymer X. When the resin constituting the optical film contains the polymer X, it is possible to easily obtain the optical film having the above-described various properties.

[2.1. Aromatic Vinyl Compound Hydrogenated Product Unit (a)]

The aromatic vinyl compound hydrogenated product unit (a) is a structural unit having a structure obtained by polymerizing an aromatic vinyl compound and then hydrogenating its unsaturated bonds. However, the aromatic vinyl compound hydrogenated product unit (a) also includes units obtained by any production method as long as it has such a structure.

Similarly to the aforementioned description, in the present application, a structural unit having a structure obtained by polymerizing styrene and hydrogenating its unsaturated bonds may be referred to as a styrene hydrogenated product unit. The styrene hydrogenated product unit also includes units obtained by any production method as long as it has such a structure.

Examples of the aromatic vinyl compound hydrogenated product unit (a) may include a structural unit represented by the following structural formula (1).

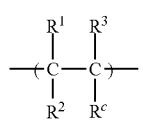
(1)

In the structural formula (1), $R^c$ represents an alicyclic hydrocarbon group. Examples of $R^c$ may include cyclohexyl groups such as a cyclohexyl group; and decahydronaphthyl groups.

In the structural formula (1), $R^1$, $R^2$, and $R^3$ each independently represent a hydrogen atom, a chain hydrocarbon group, a halogen atom, an alkoxy group, a hydroxyl group, an ester group, a cyano group, an amido group, an imido group, a silyl group, or a chain hydrocarbon group substituted with a polar group. Examples of the polar group may include a halogen atom, an alkoxy group, a hydroxyl group, an ester group, a cyano group, an amido group, an imido group, and a silyl group. Among these, $R^1$, $R^2$, and $R^3$ are preferably a hydrogen atom or a chain hydrocarbon group of 1 to 6 carbon atoms from the viewpoints of heat resistance, low birefringence, mechanical strength, and the like. The chain hydrocarbon group is preferably a saturated hydrocarbon group, more preferably an alkyl group.

Preferable specific examples of the aromatic vinyl compound hydrogenated product unit (a) may include a structural unit represented by the following formula (1-1). The structural unit represented by the formula (1-1) is a styrene hydrogenated product unit.

When a compound exemplified as the aromatic vinyl compound hydrogenated product unit (a) includes stereoisomers, any of the stereoisomers thereof may be used. As the aromatic vinyl compound hydrogenated product unit (a), one type thereof may be solely used, and two or more types thereof may also be used in combination at any ratio.

[2.2. Diene Compound Hydrogenated Product Unit (b)]

The diene compound hydrogenated product unit (b) is a structural unit having a structure obtained by polymerizing a diene compound and then hydrogenating its unsaturated bonds if the resulting polymer has unsaturated bonds.

However, the diene compound hydrogenated product unit (b) also includes units obtained by any production method as long as it has such a structure.

Similarly to the aforementioned description, in the present application, a structural unit having a structure obtained by polymerizing isoprene and hydrogenating its unsaturated bonds may be referred to as an isoprene hydrogenated product unit. The isoprene hydrogenated product unit also includes units obtained by any production method as long as it has such a structure.

The diene compound hydrogenated product unit (b) preferably has a structure obtained by polymerizing a conjugated diene compound such as a straight chain conjugated diene compound and then hydrogenating its unsaturated bonds. Examples thereof may include a structural unit represented by the following structural formula (2) and a structural unit represented by the structural formula (3).

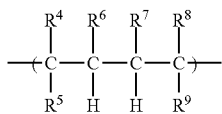

(2)

In the structural formula (2), $R^4$ to $R^9$ each independently represent a hydrogen atom, a chain hydrocarbon group, a halogen atom, an alkoxy group, a hydroxyl group, an ester group, a cyano group, an amido group, an imido group, a silyl group, or a chain hydrocarbon group substituted with a polar group. Examples of the polar group may include a halogen atom, an alkoxy group, a hydroxyl group, an ester group, a cyano group, an amido group, an imido group, and a silyl group. Among these, $R^4$ to $R^9$ are preferably a hydrogen atom or a chain hydrocarbon group of 1 to 6 carbon atoms from the viewpoints of heat resistance, low birefringence, mechanical strength, and the like. The chain hydrocarbon group is preferably a saturated hydrocarbon group, more preferably an alkyl group.

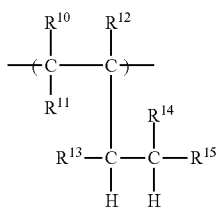

(3)

In the structural formula (3), $R^{10}$ to $R^{15}$ each independently represent a hydrogen atom, a chain hydrocarbon group, a halogen atom, an alkoxy group, a hydroxyl group, an ester group, a cyano group, an amido group, an imido group, a silyl group, or a chain hydrocarbon group substituted with a polar group. Examples of the polar group may include a halogen atom, an alkoxy group, a hydroxyl group, an ester group, a cyano group, an amido group, an imido group, and a silyl group. Among these, $R^{10}$ to $R^{15}$ are preferably a hydrogen atom or a chain hydrocarbon group of 1 to 6 carbon atoms from the viewpoints of heat resistance, low birefringence, mechanical strength, and the like. The chain hydrocarbon group is preferably a saturated hydrocarbon group, more preferably an alkyl group.

Preferable specific examples of the diene compound hydrogenated product unit (b) may include structural units represented by the following formulas (2-1) to (2-3). The structural units represented by the formulas (2-1) to (2-3) are an isoprene hydrogenated product unit.

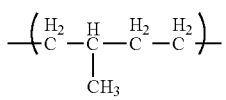

(2-1)

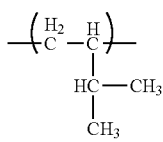

(2-2)

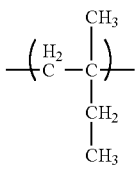

(2-3)

When a compound exemplified as the diene compound hydrogenated product unit (b) includes stereoisomers, any of the stereoisomers thereof may be used. As the diene compound hydrogenated product unit (b), one type thereof may be solely used, and two or more types thereof may also be used in combination at any ratio.

[3. Polymer X]

It is preferable that the polymer X contains a block A having the aromatic vinyl compound hydrogenated product unit (a) and a block B having the diene compound hydrogenated product unit (b). Further, it is preferable that the polymer X has a triblock molecular structure having one block B per molecule and two blocks A per molecule connected to both ends of the block B. That is, it is preferable that the polymer X is a triblock copolymer including: one block B per molecule; one block A1 per molecule connected to one end of the block B and having the aromatic vinyl compound hydrogenated product unit (a); and one block A2 per molecule connected to the other end of the block B and having the aromatic vinyl compound hydrogenated product unit (a).

In the polymer X as the triblock copolymer described above, from the viewpoint of easily obtaining the optical film having the above-described properties, it is preferable that a weight ratio (A1+A2)/B that is a ratio of the total of the block A1 and the block A2 relative to the block B falls within a specific range. Specifically, the weight ratio (A1+A2)/B is preferably 70/30 or more, and more preferably 75/25 or more, and is preferably 90/10 or less, and more preferably 82/18 or less.

In the polymer X as the triblock copolymer described above, from the viewpoint of easily obtaining the optical film having the above-described properties, it is preferable that a weight ratio A1/A2 that is a ratio of the block A1 relative to the block A2 falls within a specific range. Specifically, the weight ratio A1/A2 is preferably 5 or more, more preferably 5.2 or more, and particularly preferably 5.5 or more, and is preferably 8 or less, more preferably 7.8 or less, and particularly preferably 7.5 or less.

The weight-average molecular weight Mw of the polymer X is preferably 50,000 or more, more preferably 55,000 or more, and particularly preferably 60,000 or more, and is preferably 80,000 or less, more preferably 75,000 or less, and particularly preferably 70,000 or less. When the weight-average molecular weight Mw falls within the aforementioned range, the optical film having the above-described properties can be easily obtained. In particular, by reducing the weight-average molecular weight Mw, it is possible to effectively reduce expression of retardation.

The molecular weight distribution (weight-average molecular weight (Mw)/number-average molecular weight (Mn)) of the polymer X is preferably 2.0 or less, more preferably 1.7 or less, and particularly preferably 1.5 or less, and is preferably 1.0 or more. When the weight-average molecular weight Mw falls within the aforementioned range, viscosity of the polymer can be lowered to enhance moldability. In addition, it is possible to effectively reduce expression of retardation.

The weight-average molecular weight Mw and the number-average molecular weight Mw of the polymer X may be measured as a polystyrene-equivalent value by gel permeation chromatography using tetrahydrofuran as a solvent.

It is preferable that each of the block A1 and the block A2 independently consists only of the aromatic vinyl compound hydrogenated product unit (a), but they may include an optional unit other than the aromatic vinyl compound hydrogenated product unit (a). Examples of the optional structural unit may include a structural unit based on a vinyl compound other than the aromatic vinyl compound hydrogenated product unit (a). The content ratio of the optional structural unit in the block A is preferably 10% by weight or less, more preferably 5% by weight or less, and particularly preferably 1% by weight or less.

It is preferable that the block B consists only of the diene compound hydrogenated product unit (b), but it may include an optional unit other than the diene compound hydrogenated product unit (b). Examples of the optional structural unit may include a structural unit based on a vinyl compound other than the aromatic vinyl compound hydrogenated product unit (a). The content ratio of the optional structural unit in the block B is preferably 10% by weight or less, more preferably 5% by weight or less, and particularly preferably 1% by weight or less.

The polymer X as the triblock copolymer described above has a small photoelastic coefficient, low expression of retardation, and low water vapor absorption, so that the polymer X has low tendency to cause retardation changes in a high temperature and high humidity environment. Therefore, the optical film of the present invention can be easily obtained from the resin containing the above-described triblock copolymer.

[4. Method for Producing Polymer X]

The method for producing the polymer X is not particularly limited, and any production method may be adopted. For example, the polymer X may be produced by preparing monomers corresponding to the aromatic vinyl compound hydrogenated product unit (a) and the diene compound hydrogenated product unit (b), polymerizing them, and hydrogenating the obtained polymer.

As the monomer corresponding to the aromatic vinyl compound hydrogenated product unit (a), an aromatic vinyl compound may be used. Examples thereof may include styrenes such as styrene, α-methylstyrene, α-ethylstyrene, α-propylstyrene, α-isopropylstyrene, α-t-butylstyrene, 2-methylstyrene, 3-methylstyrene, 4-methylstyrene, 2,4-diisopropylstyrene, 2,4-dimethylstyrene, 4-t-butylstyrene, 5-t-butyl-2-methylstyrene, monochlorostyrene, dichlorostyrene, monofluorostyrene, and 4-phenylstyrene; vinylcyclohexanes such as vinylcyclohexane and 3-methylisopropenylcyclohexane; and vinylcyclohexenes such as 4-vinylcyclohexene, 4-isopropenylcyclohexene, 1-methyl-4-vinylcyclohexene, 1-methyl-4-isopropenylcyclohexene, 2-methyl-4-vinylcyclohexene, and 2-methyl-4-isopropenylcyclohexene. As these monomers, one type thereof may be solely used, and two or more types thereof may also be used in combination at any ratio.

Examples of the monomer corresponding to the diene compound hydrogenated product unit (b) may include chain conjugated dienes such as butadiene, isoprene, 2,3-dimethyl-1,3-butadiene, 1,3-pentadiene, and 1,3-hexadiene. As these monomers, one type thereof may be solely used, and two or more types thereof may also be used in combination at any ratio.

As the reaction mode of the polymerization, anionic polymerization may be usually adopted. Further, the polymerization may be performed by any of bulk polymerization, solution polymerization, and the like. Among these, solution polymerization is preferable in order to continuously perform the polymerization reaction and the hydrogenation reaction.

Examples of the reaction solvent for polymerization may include an aliphatic hydrocarbon solvent such as n-butane, n-pentane, isopentane, n-hexane, n-heptane, and isooctane; an alicyclic hydrocarbon solvent such as cyclopentane, cyclohexane, methylcyclopentane, methylcyclohexane, and decalin; and an aromatic hydrocarbon solvent such as benzene and toluene. Among these, an aliphatic hydrocarbon solvent and an alicyclic hydrocarbon solvent are preferably used because the solvents as they are can be used as an inert solvent also for the hydrogenation reaction.

As the reaction solvent, one type thereof may be solely used, and two or more types thereof may also be used in combination at any ratio.

The reaction solvent is usually used in a proportion of 200 parts by weight to 10,000 parts by weight relative to 100 parts by weight of the total monomers.

A polymerization initiator is usually used in the polymerization. Examples of the polymerization initiator may include a monoorganolithium such as n-butyllithium, sec-butyllithium, t-butyllithium, hexyllithium, and phenyllithium; and a polyfunctional organolithium compound such as dilithiomethane, 1,4-dilithiobutane and 1,4-dilithio-2-ethylcyclohexane. As the polymerization initiator, one type thereof may be solely used, and two or more types thereof may also be used in combination at any ratio.

Examples of the method for producing the triblock copolymer including the block A1, the block A2, and the block B as the polymer X may include a production method including the following first step to third step. Herein, the material referred to as a "monomer composition" includes not only a mixture of two or more substances but also a material composed of a single substance.

First step: a step of polymerizing a monomer composition (a1) containing an aromatic vinyl compound to form the block A.

Second step: a step of polymerizing a monomer composition (b), which contains a diene compound, at one end of the resulting block A to form the block B, thereby forming a diblock polymer of A-B.

Third step: a step of polymerizing a monomer composition (a2), which contains an aromatic vinyl compound, at the end of the resulting diblock polymer on the side of the block B to obtain a triblock copolymer. The monomer composition (a1) and the monomer composition (a2) may be the same as or different from each other.

When each of the polymer blocks is formed, a polymerization promoter and a randomizer may be used to prevent the chain of one component from becoming excessively long in each block. For example, when the polymerization is performed by anionic polymerization, a Lewis base compound may be used as a randomizer. Specific examples of the Lewis base compound may include an ether compound such as dimethyl ether, diethyl ether, diisopropyl ether, dibutyl ether, tetrahydrofuran, diphenyl ether, ethylene glycol diethyl ether, and ethylene glycol methyl phenyl ether; a tertiary amine compound such as tetramethylethylenediamine, trimethylamine, triethylamine, and pyridine; an alkali metal alkoxide compound such as potassium-t-amyl oxide and potassium-t-butyl oxide; and a phosphine compound such as triphenylphosphine. As these Lewis base compounds, one type thereof may be solely used, and two or more types thereof may also be used in combination at any ratio.

The polymerization temperature is not limited as long as the polymerization proceeds, but is usually 0° C. or higher, and preferably 20° C. or higher, and is usually 200° C. or lower, preferably 100° C. or lower, and more preferably 80° C. or lower.

After the polymerization, the polymer may be collected from the reaction mixture by any method, if necessary. Examples of the method for collecting the polymer may include a steam stripping method, a direct desolvation method, and an alcohol coagulation method. When a solvent inert to the hydrogenation reaction is used in the polymerization as the reaction solvent, the polymerization solution as it is may be subjected to the hydrogenation step without the collection of the polymer from the polymerization solution.

There is no limitation on the hydrogenation method of the polymer, and any method may be adopted. The hydrogenation may be performed, for example, using a suitable hydrogenation catalyst. More specifically, the hydrogenation may be performed using a hydrogenation catalyst containing at least one metal selected from the group consisting of nickel, cobalt, iron, rhodium, palladium, platinum, ruthenium, and rhenium in an organic solvent. The hydrogenation catalyst may be a heterogeneous catalyst or a homogeneous catalyst. As the hydrogenation catalyst, one type thereof may be solely used, and two or more types thereof may also be used in combination at any ratio.

As the heterogeneous catalyst, a metal or a metal compound as it is may be used. Alternatively, the metal or metal compound may be used in a form of being supported on a suitable carrier. Examples of the carrier may include activated carbon, silica, alumina, calcium carbide, titania, magnesia, zirconia, diatomaceous earth, and silicon carbide. The amount of the catalyst supported on the carrier is usually 0.01% by weight or more, and preferably 0.05% by weight or more, and is usually 80% by weight or less, and preferably 60% by weight or less.

Examples of the homogeneous catalyst may include a catalyst that are a combination of a nickel, cobalt, or iron compound with an organometallic compound (for example, an organoaluminum compound or an organolithium compound); and an organometallic complex catalyst of rhodium, palladium, platinum, ruthenium, rhenium, and the like. Examples of the nickel, cobalt, or iron compound may include an acetylacetone salt, a naphthenate, a cyclopentadienyl compound, and a cyclopentadienyl dichloro compound of these metals. Examples of the organoaluminum compound may include an alkylaluminum such as triethylaluminum and triisobutylaluminum; an aluminum halide such as diethylaluminum chloride and ethylaluminum dichloride; and an alkylaluminum hydride such as diisobutylaluminum hydride.

Examples of the organometallic complex catalyst may include metal complexes such as a γ-dichloro-π-benzene complex, a dichloro-tris(triphenylphosphine) complex, and a hydride-chloro-triphenylphosphine) complex of each of the above-described metals.

The using amount of the hydrogenation catalyst is usually 0.01 part by weight or more, preferably 0.05 part by weight or more, and more preferably 0.1 part by weight or more, and is usually 100 parts by weight or less, preferably 50 parts by weight or less, and more preferably 30 parts by weight or less, relative to 100 parts by weight of the polymer.

The reaction temperature during the hydrogenation reaction is usually 10° C. to 250° C., but is preferably 50° C. or higher, and more preferably 80° C. or higher, and is preferably 200° C. or lower, and more preferably 180° C. or lower, because the hydrogenation rate can be increased and the polymer chain cleavage reaction can be reduced. The pressure during the reaction is usually 0.1 MPa to 30 MPa, but in addition to the above reasons, from the viewpoint of operability, it is preferably 1 MPa or more, and more preferably 2 MPa or more, and is preferably 20 MPa or less, and more preferably 10 MPa or less.

The hydrogenation rate is usually 90% or more, preferably 95% or more, and more preferably 97% or more. By increasing the hydrogenation rate, low birefringence, thermal stability, and the like of the polymer X can be improved. The hydrogenation rate may be measured by $^1$H-NMR.

[Optional Component Other than Polymer X]

The optical film of the present invention may consist only of the polymer X, but may contain an optional component other than the polymer X.

Examples of the optional component may include an inorganic particle; a stabilizer such as an antioxidant, a thermal stabilizer, an ultraviolet absorber, and a near infrared absorber; a resin modifier such as a lubricant and a plasticizer; a colorant such as a dye and a pigment; and an antistatic agent. As the optional component, one type thereof may be solely used, and two or more types thereof may also be used in combination at any ratio. However, from the viewpoint of remarkably exerting the effect of the present invention, it is preferable that the content ratio of the optional component is small. For example, the total ratio of the optional component is preferably 10 parts by weight or less, more preferably 5 parts by weight or less, and still more preferably 3 parts by weight or less, relative to 100 parts by weight of the polymer X.

[6. Size and Desirable Properties of Optical Film]

The thickness of the optical film of the present invention is usually 10 μm or more, preferably 15 μm or more, and more preferably 20 μm or more, and is usually 75 μm or less, preferably 60 μm or less, and more preferably 50 μm or less. When the thickness is equal to or more than the lower limit of the aforementioned range, damage prevention capability and handleability of the polarizing plate in which the optical film is used as a polarizer protective film can be improved. When it is equal to or less than the upper limit, the polarizing plate can be made thinner.

The optical film of the present invention is usually a transparent layer that allows visible light to pass therethrough. The specific light transmittance may be appropriately selected in accordance with the use application of the optical film. For example, the light transmittance for a wavelength of 420 nm to 780 nm is preferably 85% or more, and more preferably 88% or more. When the optical film having such a high light transmittance is mounted on a display device such as a liquid crystal display device, deterioration of luminance after use for a long period of time can particularly be prevented.

[7. Optional Layer]

The optical film of the present invention may include only one layer of the film formed of a resin containing the polymer X. Alternatively, the optical film of the present invention may include two or more layers of the films. The optical film of the present invention may further include an optional layer in addition to the film formed of the resin containing the polymer X as long as the effects of the present invention are considerably impaired thereby. Examples of the optional layer may include a mat layer for improving the slidability of the film, a hard-coat layer such as an impact-resistant polymethacrylate resin layer, and an anti-reflection layer.

[8. Method for Producing Optical Film]

The method for producing the optical film of the present invention is not particularly limited, and any production method may be adopted. For example, the optical film of the present invention may be produced by preparing the resin containing the polymer X and molding the resin into a desired shape. In particular, it is preferable to produce the optical film by a production method that includes melt extrusion molding of the resin containing the polymer X. Performing the melt extrusion molding makes it possible to efficiently and easily produce the optical film excellent in mechanical strength and surface precision while preventing the expression of retardation.

As the resin containing the polymer X, the polymer X prepared by the method described above as it is may be used. Alternatively, as the resin containing the polymer X, a mixture of the polymer X with an optional component, if necessary, may be used.

It is preferable that the temperature of the resin for performing the melt extrusion molding (hereinafter also referred to as "extrusion temperature" as necessary) falls within a specific range. Specifically, the extrusion temperature is preferably 180° C. or higher, more preferably 185° C. or higher, and particularly preferably 190° C. or higher, and is preferably 260° C. or lower, more preferably 250° C. or lower, and particularly preferably 240° C. or lower. When the extrusion temperature falls within the aforementioned temperature range, the optical film having the above-described properties can be easily obtained.

Performing the melt extrusion molding makes it possible to obtain a long-length resin film. This resin film as it is may serve as the optical film of the present invention. Alternatively, this resin film may be further subjected to an optional treatment and a resulting product may serve as the optical film of the present invention. For example, the resin film described above may be used as a pre-stretch film and this pre-stretch film may be subjected to a stretching treatment to obtain the optical film as a stretched film. Retardation expressed in the film obtained by stretching can be reduced by appropriately adjusting a ratio of structural units contained in the polymer X. Thus, when the stretching treatment described above is performed, the optical film having a thin thickness, a large area, and a favorable quality can be easily produced, and a yield of the film can thereby be increased.

When the optical film is produced as the stretched film, the method for producing the optical film includes stretching of the resin film that has been obtained as a pre-stretch film by the melt extrusion molding. During this treatment, stretching conditions may be appropriately adjusted so as to obtain the optical film described above. The stretching performed in the stretching treatment may be uniaxial stretching, biaxial stretching, or other stretching. The stretching direction may be set to any direction. For example, when the pre-stretch film is a long-length film, the stretching direction may be any of a lengthwise direction, a widthwise direction, and a diagonal direction other than the lengthwise and widthwise directions of the film. When biaxial stretching is performed, an angle formed by two stretching directions may be usually an angle at which two directions are orthogonal to each other. However, the angle is not limited thereto and may be any angle. Biaxial stretching may be sequential biaxial stretching or simultaneous biaxial stretching. Simultaneous biaxial stretching is preferable from the viewpoint of obtaining higher productivity.

The stretching temperature is preferably 130° C. or higher, more preferably 150° C. or higher, and particularly preferably 155° C. or higher, and is preferably 180° C. or lower, more preferably 175° C. or lower, and particularly preferably 170° C. or lower. When the stretching temperature falls within the aforementioned temperature range, a stretched film as the optical film having the above-described properties can be easily obtained.

The stretching ratio is preferably 1.1 times or more, more preferably 1.25 times or more, and particularly preferably 1.5 times or more, and is preferably 2.5 times or less, more preferably 2.25 times or less, and particularly preferably 2 times or less. When the stretching ratio falls within the aforementioned range, a stretched film as the optical film having the above-described properties can be easily obtained. In the case of biaxial stretching, the stretching ratio in each of the two stretching directions may be within this range.

[9. Use Application of Optical Film: Polarizing Plate]

The optical film of the present invention may be suitably used as a protective film for protecting other layers in a display device such as a liquid crystal display device. Among these, the optical film of the present invention is suitable as a polarizer protective film, and particularly suitable as an inner polarizer protective film.

The polarizing plate of the present invention includes a polarizer and the above-described optical film. In the polarizing plate of the present invention, the optical film can function as a polarizer protective film. The polarizing plate of the present invention may further include an adhesive agent layer between the optical film and the polarizer for bonding them.

The polarizer is not particularly limited, and any polarizer may be used. Examples of the polarizer may include those obtained by making a polyvinyl alcohol film adsorb a material such as iodine or a dichroic dye, and performing stretching processing. Examples of the adhesive agent constituting the adhesive agent layer may include adhesive agents using various types of polymers as a base polymer. Examples of such base polymers may include an acrylic polymer, a silicone polymer, a polyester, a polyurethane, a polyether, and a synthetic rubber.

Although the number of the polarizers and the number of the protective films included in the polarizing plate may be any number, the polarizing plate of the present invention may usually include one polarizer and two protective films provided on both sides thereof. Of these two protective films, both of them may be the optical film of the present invention, or only one of them may be the optical film of the present invention. In particular, in a liquid crystal display device including a light source and a liquid crystal cell, and having polarizing plates on both the light source side and the display surface side of the liquid crystal cell, it is particularly preferable to include the optical film of the present invention as a protective film used at a position on the light source side with respect to the polarizer on the display surface side. With such a configuration, it is possible to easily configure a liquid crystal display device having excellent display quality with small light leakage and color unevenness at an oblique viewing angle.

Examples of the liquid crystal display devices to which the polarizing plate of the present invention is suitably provided may include liquid crystal display devices including liquid crystal cells of driving modes such as an in-plane switching (IPS) mode, a vertical alignment (VA) mode, a multi-domain vertical alignment (MVA) mode, a continuous pinwheel alignment (CPA) mode, a hybrid alignment nematic (HAN) mode, a twisted nematic (TN) mode, a super twisted nematic (STN) mode, and an optical compensated bend (OCB) mode. Among these, a liquid crystal display device including a liquid crystal cell in an IPS mode is particularly preferably because effects of suppressing light leakage and color unevenness at an oblique viewing angle by the optical film of the present invention are remarkable.

EXAMPLES

Hereinafter, the present invention will be specifically described by illustrating Examples. However, the present invention is not limited to the Examples described below. The present invention may be optionally modified for implementation without departing from the scope of claims of the present invention and its equivalents.

In the following description, "%" and "part" representing quantity are on the basis of weight, unless otherwise specified. The operations described below were performed under the conditions of normal temperature and normal pressure in the atmospheric air, unless otherwise specified.

[Evaluation Methods]
[Method for Measuring Molecular Weight]

The weight-average molecular weight and the number-average molecular weight of the polymer were measured as a standard polystyrene-equivalent value at 38° C. by gel permeation chromatography using tetrahydrofuran as an eluent. As the measurement device, HLC-8020 GPC manufactured by Tosoh Corp. was used.

[Method for Measuring Retardation]

The in-plane retardation Re and the thickness-direction retardation Rth of the film were measured using a phase difference meter ("AXOScan" manufactured by Axometrics, Inc.).

[Method for Measuring Photoelastic Coefficient]

The film was cut out in a size of 100 mm×10 mm to obtain a test piece. To the test piece thus obtained, a load of 0 gram-weight, 100 gram-weight, 200 gram-weight, 300 gram-weight, 400 gram-weight, and 500 gram-weight was applied, and the in-plane retardation with the load was measured. The measurement of the aforementioned in-plane retardation was performed at a measurement wavelength of 560 nm using an ellipsometer ("M-2000" manufactured by J. A. Woollam Co., Inc.). A stress was calculated as a load per cross-sectional area of the film while defining a thickness of the film as d. The photoelastic coefficient was derived as a change rate of a ratio Re(560)/d with respect to the stress. The aforementioned ratio Re(560)/d represents a ratio of the in-plane retardation Re(560) relative to the thickness d.

[Method for Evaluating Change in Birefringence in High Temperature and High Humidity Test]

The initial in-plane retardation Re0 and the initial thickness-direction retardation Rth0 of the film were measured at a measurement wavelength of 560 nm using the method described above.

Then, the aforementioned film was stored at a temperature of 60° C. and a humidity of 90% for 4 hours. Subsequently, the post-test in-plane retardation Re1 and the post-test thickness-direction retardation Rth1 of the film after being stored were measured at a measurement wavelength of 560 nm using the method described above.

A change $\Delta Re(560)/d$ that is the change of the ratio $Re(560)/d$ which is a ratio of the in-plane retardation $Re(560)$ measured at a wavelength of 560 nm relative to the thickness d, the change being the result of storage in a high temperature and high humidity environment, was calculated using the following formula (X1).

$$\Delta Re(560)/d = (Re1 - Re0)/d \tag{X1}$$

Further, a change $\Delta Rth(560)/d$ that is the change of the ratio $Rth(560)/d$ which is a ratio of the thickness-direction retardation $Rth(560)$ measured at a wavelength of 560 nm relative to the thickness d, the change being the result of storage in a high temperature and high humidity environment, was calculated using the following formula (X2).

$$\Delta Rth(560)/d = (Rth1 - Rth0)/d \tag{X2}$$

Example 1

(1-1. First Step of Polymerization Reaction: Extension of Block A1)

A stainless-steel reaction vessel equipped with a stirrer, which had been sufficiently dried and purged with nitrogen, was charged with 320 parts of dehydrated cyclohexane, 60 parts of styrene, and 0.38 part of dibutyl ether. While the resulting mixture was stirred at 60° C., 0.41 part of an n-butyllithium solution (a hexane solution containing 15% by weight of n-butyllithium) was added thereto, to initiate a polymerization reaction in order to perform a first step of polymerization reaction. An hour after the onset of the reaction, a sample was collected from the reaction mixture and subjected to an analysis by gas chromatography (GC). As a result, a polymerization conversion rate was 99.5%.

(1-2. Second Step of Reaction: Extension of Block B)

To the reaction mixture obtained in the step (1-1) described above, 30 parts of isoprene was added, to initiate a second step of polymerization reaction. An hour after the onset of the second step of polymerization reaction, a sample was collected from the reaction mixture and subjected to the analysis by GC. As a result, the polymerization conversion rate was 99.5%.

(1-3. Third Step of Reaction: Extension of Block A2)

To the reaction mixture obtained in the step (1-2) described above, 10 parts of styrene was added, to initiate a third step of polymerization reaction. An hour after the onset of the third step of polymerization reaction, a sample was collected from the reaction mixture and the weight-average molecular weight Mw and the number-average molecular weight Mn of the polymer were measured. Further, the sample collected at this time point was subjected to the analysis by GC. As a result, the polymerization conversion rate was almost 100%. Immediately after that, 0.2 part of isopropyl alcohol was added to the reaction mixture to terminate the reaction. In this manner, a mixture containing a polymer having a triblock molecular structure of styrene-isoprene-styrene was obtained.

The polymer thus obtained was a copolymer which has a triblock molecular structure with a polymerization ratio of styrene/isoprene/styrene=60/30/10. The weight-average molecular weight (Mw) of the copolymer was about 64,000 and the molecular weight distribution (Mw/Mn) thereof was 1.1.

(1-4. Fourth Step of Reaction: Hydrogenation)

Subsequently, the mixture containing the aforementioned copolymer was transferred to a pressure-resistant reaction vessel equipped with a stirrer, and 8.0 parts of a nickel catalyst supported on a diatomaceous earth ("E22U" manufactured by JGC C&C, a nickel supported amount of 60%) as a hydrogenation catalyst and 100 parts of dehydrated cyclohexane were added to and mixed with the mixture.

After replacing the atmosphere inside the reaction vessel with hydrogen gas, a hydrogenation reaction was performed by further supplying hydrogen while stirring the solution at a temperature of 190° C. and a pressure of 4.5 MPa for 6 hours. The copolymer was hydrogenated by the hydrogenation reaction to obtain a polymer X. The polymer X included in the reaction solution thus obtained had the weight-average molecular weight (Mw) of about 66,000 and the molecular weight distribution (Mw/Mn) of 1.11.

After the completion of the hydrogenation reaction, the reaction solution was filtered to remove the hydrogenation catalyst. Then, 2.0 parts of a xylene solution, in which 0.1 parts of pentaerythrityl.tetrakis[3-(3,5-di-t-butyl-4-hydroxyphenyl)propionate] ("Songnox1010" manufactured by Songwon Industrial Co., Ltd.) as a phenol-based antioxidant was dissolved, was added thereto and dissolved therein.

Subsequently, the solvent cyclohexane and xylene and other volatile components were removed from the aforementioned solution at a temperature of 260° C. and a pressure of 0.001 MPa or less using a cylinder-type concentration dryer ("Kontro" manufactured by Hitachi, Ltd.). The molten polymer was extruded in a strand shape from a die, cooled, and then processed with a pelletizer to produce 95 parts of pellets containing the polymer X.

The polymer X contained in the pellets thus obtained had the weight-average molecular weight (Mw) of 65,000, the molecular weight distribution (Mw/Mn) of 1.13, and the hydrogenation ratio of almost 100%.

(1-5). Production of Optical Film)

The aforementioned pellets were subjected to melt extrusion molding at an extrusion temperature of 220° C. using an extrusion molding machine (manufactured by Sumitomo Heavy Industries Modern, Ltd.) to obtain a long-length resin film having a thickness of 40 μm as the optical film. The resin film thus obtained was evaluated by the methods described above.

Example 2

In the step (1-1), the amount of styrene was changed to 70 parts. In the step (1-2), the amount of isoprene was changed to 20 parts. A resin film as the optical film was produced and evaluated by the same manner as that of Example 1 except for the matters described above.

Example 3

In the step (1-1), the amount of styrene was changed to 75 parts. In the step (1-2), the amount of isoprene was changed to 15 parts. A resin film as the optical film was produced and evaluated by the same manner as that of Example 1 except for the matters described above.

Example 4

In the step (1-5), the melt extrusion molding was performed so that the resin film thus obtained had a thickness of about 100 μm. A long-length resin film was produced by the same manner as that of Example 1 except for the matter described above.

The resin film thus obtained was stretched in the film width direction at a stretching temperature of 160° C. and a stretching ratio of 2.5 times using a biaxial stretching machine (manufactured by Toyo Seiki Co., Ltd.) to obtain a stretched film as the optical film. The stretched film thus obtained was evaluated by the methods described above.

Example 5

In the step (1-1), the amount of styrene was changed to 70 parts. In the step (1-2), the amount of isoprene was changed to 20 parts. Furthermore, in the step (1-5), the melt extrusion molding was performed so that the resin film thus obtained had a thickness of about 100 μm. A long-length resin film was produced by the same manner as that of Example 1 except for the matters described above.

The resin film thus obtained was stretched in the film width direction at a stretching temperature of 160° C. and a stretching ratio of 2.5 times using a biaxial stretching machine (manufactured by Toyo Seiki Co., Ltd.) to obtain a stretched film as the optical film. The stretched film thus obtained was evaluated by the methods described above.

Example 6

In the step (1-1), the amount of styrene was changed to 75 parts. In the step (1-2), the amount of isoprene was changed to 15 parts. Furthermore, in the step (1-5), the melt extrusion molding was performed so that the resin film thus obtained had a thickness of about 100 μm. A long-length resin film was produced by the same manner as that of Example 1 except for the matters described above.

The resin film thus obtained was stretched in the film width direction at a stretching temperature of 160° C. and a stretching ratio of 2.5 times using a biaxial stretching machine (manufactured by Toyo Seiki Co., Ltd.) to obtain a stretched film as the optical film. The stretched film thus obtained was evaluated by the methods described above.

Comparative Example 1

A triacetylcellulose film ("ZeroTAC (registered trademark)" manufactured by Konica Minolta, Inc., thickness 40 μm) was evaluated as the optical film.

Comparative Example 2

An acrylic film ("OXIS" manufactured by Okura Industrial Co., Ltd., thickness 40 μm) was evaluated as the optical film.

Comparative Example 3

In the step (1-2), the amount of isoprene was changed to 20 parts. In the step (1-3), the amount of styrene was changed to 20 parts. Furthermore, in the step (1-5), the melt extrusion molding was performed so that the resin film thus obtained had a thickness of about 100 μm. A long-length resin film was produced by the same manner as that of Example 1 except for the matters described above.

The resin film thus obtained was stretched in the film width direction at a stretching temperature of 160° C. and a stretching ratio of 2.5 times using a biaxial stretching machine (manufactured by Toyo Seiki Co., Ltd.) to obtain a stretched film as the optical film. The stretched film thus obtained was evaluated by the methods described above.

Comparative Example 4

In the step (1-1), the amount of styrene was changed to 90 parts. In the step (1-2), the amount of isoprene was changed to 5 parts. In the step (1-3), the amount of styrene was changed to 5 parts. Furthermore, in the step (1-5), the melt extrusion molding was performed so that the resin film thus obtained had a thickness of about 100 μm. A long-length resin film was produced by the same manner as that of Example 1 except for the matters described above.

The resin film thus obtained was stretched in the film width direction at a stretching temperature of 160° C. and a stretching ratio of 2.5 times using a biaxial stretching machine (manufactured by Toyo Seiki Co., Ltd.) to obtain a stretched film as the optical film. The stretched film thus obtained was evaluated by the methods described above.

Comparative Example 5

In the step (1-1), the amount of styrene was changed to 70 parts. In the step (1-2), the amount of isoprene was changed to 20 parts. Furthermore, in order to increase the weight-average molecular weight, the weight-average molecular weight (Mw) of the polymer X obtained in the step (1-4) was adjusted to 120,000 by reducing the amount of the polymerization initiator. A long-length resin film was produced by the same manner as that of Example 1 except for the matters described above.

The resin film thus obtained was stretched in the film width direction at a stretching temperature of 160° C. and a stretching ratio of 2.5 times using a biaxial stretching machine (manufactured by Toyo Seiki Co., Ltd.) to obtain a stretched film as the optical film. The stretched film thus obtained was evaluated by the method described above.

Comparative Example 6

In the step (1-2), the amount of isoprene was changed to 40 parts. Furthermore, the step (1-3) was not performed, and the reaction mixture obtained in the step (1-2) was supplied to the step (1-4) to perform the hydrogenation reaction. A long-length resin film was produced by the same manner as that of Example 1 except for the matters described above.

The resin film thus obtained was stretched in the film width direction at a stretching temperature of 130° C. and a stretching ratio of 2.5 times using a biaxial stretching machine (manufactured by Toyo Seiki Co., Ltd.) to obtain a stretched film as the optical film. The stretched film thus obtained was evaluated by the methods described above.

RESULTS

Results of Examples and Comparative Examples are shown in Table 1 and Table 2 below. Meanings of abbreviations in the tables below are as follows.
A1/B/A2: weight ratio of block A1/block B/block A2
A/B: weight ratio of (total of block A1 and block A2)/block B
A1/A2: weight ratio of block A1/block A2
Mw: weight-average molecular weight
Mw/Mn: molecular weight distribution
HSIS: hydrogenated product of triblock copolymer of styrene-isoprene-styrene
TAC: triacetylcellulose
Acryl: acrylic polymer
ΔRe(560)/d: a change of ratio Re(560)/d that is a ratio of in-plane retardation Re(560) measured at wavelength of 560 nm relative to thickness d, the change being the result of storage at temperature of 60° C. and humidity of 90% for 4 hours
ΔRth(560)/d: a change of ratio Rth(560)/d that is a ratio of thickness-direction retardation Rth(560) measured at wavelength of 560 nm relative to thickness d, the change being the result of storage at temperature of 60° C. and humidity of 90% for 4 hours

TABLE 1

[Configurations of Examples and Comparative Examples]

|  | Polymer | A1/B/A2 | A/B | A1/A2 | Mw | Mw/Mn | Stretching temperature [° C.] | Stretching ratio [times] | Thickness [μm] |
|---|---|---|---|---|---|---|---|---|---|
| Ex. 1 | HSIS | 60/30/10 | 70/30 | 6 | 65000 | 1.13 | — | — | 40 |
| Ex. 2 | HSIS | 70/20/10 | 80/20 | 7 | 65000 | 1.24 | — | — | 40 |
| Ex. 3 | HSIS | 75/15/10 | 85/15 | 7.5 | 65000 | 1.25 | — | — | 40 |
| Ex. 4 | HSIS | 60/30/10 | 70/30 | 6 | 65000 | 1.13 | 160 | 2.5 | 42 |
| Ex. 5 | HSIS | 70/20/10 | 80/20 | 7 | 65000 | 1.24 | 160 | 2.5 | 42 |
| Ex. 6 | HSIS | 75/15/10 | 85/15 | 7.5 | 65000 | 1.25 | 160 | 2.5 | 42 |
| Comp. Ex. 1 | TAC | — | — | — | — | — | — | — | 40 |
| Comp. Ex. 2 | Acryl | — | — | — | — | — | — | — | 40 |
| Comp. Ex. 3 | HSIS | 60/20/20 | 80/20 | 3 | 65000 | 1.44 | 160 | 2.5 | 40 |
| Comp. Ex. 4 | HSIS | 90/5/5 | 95/5 | 18 | 65000 | 1.38 | 160 | 2.5 | 41 |
| Comp. Ex. 5 | HSIS | 70/20/10 | 80/20 | 7 | 120000 | 1.54 | 160 | 2.5 | 41 |
| Comp. Ex. 6 | HSIS | 60/40 | 60/40 | — | 65000 | 1.35 | 130 | 2.5 | 42 |

TABLE 2

[Results of Examples and Comparative Examples]

| | Re (560) [nm] | Rth (560) [nm] | ΔRe (560)/d | ΔRth (560)/d | Photoelastic coefficient [(dyn/cm$^2$)$^{-1}$] | Re (450)/ Re (560) | Re (650)/ Re (560) |
|---|---|---|---|---|---|---|---|
| Ex. 1 | 0.39 | 0.36 | $3.87 \times 10^{-7}$ | $-8.13 \times 10^{-7}$ | $1.18 \times 10^{-13}$ | 0.32 | 1.27 |
| Ex. 2 | 0.11 | −0.64 | $1.55 \times 10^{-6}$ | $-1.83 \times 10^{-6}$ | $1.26 \times 10^{-13}$ | 0.79 | 1.85 |
| Ex. 3 | 0.56 | −0.84 | $1.25 \times 10^{-6}$ | $-1.20 \times 10^{-6}$ | $1.43 \times 10^{-13}$ | 0.83 | 1.79 |
| Ex. 4 | 0.50 | −0.07 | $-3.41 \times 10^{-7}$ | $-2.36 \times 10^{-6}$ | $1.30 \times 10^{-13}$ | 0.33 | 1.34 |
| Ex. 5 | 0.50 | 0.41 | $-1.24 \times 10^{-6}$ | $1.14 \times 10^{-6}$ | $1.40 \times 10^{-13}$ | 0.70 | 1.69 |
| Ex. 6 | 0.80 | 0.78 | $2.23 \times 10^{-6}$ | $-3.35 \times 10^{-6}$ | $1.46 \times 10^{-13}$ | 0.75 | 1.83 |
| Comp. Ex. 1 | 0.424 | 1.536 | $3.44 \times 10^{-5}$ | $6.88 \times 10^{-5}$ | $6.7 \times 10^{-13}$ | 1.88 | 0.35 |
| Comp. Ex. 2 | 2.916 | −2.077 | $2.00 \times 10^{-6}$ | $7.28 \times 10^{-6}$ | $1.52 \times 10^{-13}$ | 1.03 | 0.99 |
| Comp. Ex. 3 | 3.1 | −2.8 | $-4.34 \times 10^{-7}$ | $-3.42 \times 10^{-6}$ | $1.60 \times 10^{-13}$ | 1.58 | 0.90 |
| Comp. Ex. 4 | 6.3 | −4.8 | $-1.59 \times 10^{-6}$ | $1.20 \times 10^{-6}$ | $1.87 \times 10^{-13}$ | 1.63 | 0.88 |
| Comp. Ex. 5 | 3.2 | −3.8 | $-4.87 \times 10^{-7}$ | $-5.84 \times 10^{-6}$ | $1.78 \times 10^{-13}$ | 1.57 | 0.89 |
| Comp. Ex. 6 | 2.8 | −2.7 | $-4.89 \times 10^{-6}$ | $-3.94 \times 10^{-6}$ | $3.45 \times 10^{-13}$ | 1.58 | 0.78 |

The invention claimed is:

1. An optical film, wherein
a photoelastic coefficient thereof is $1.5 \times 10^{-13}$ (dyn/cm$^2$)$^{-1}$ or less,
an in-plane retardation Re(560) thereof at a wavelength of 560 nm is 1.0 nm or less,
an absolute value of a thickness-direction retardation Rth(560) thereof at a wavelength of 560 nm |Rth(560)| is 1.0 nm or less,
a change of a ratio Re(560)/d that is a ratio of the in-plane retardation Re(560) at a wavelength of 560 nm relative to a thickness d, the change being a result of storage at a temperature of 60° C. and a humidity of 90% for 4 hours, is $0.5 \times 10^{-5}$ or less, and
a change of a ratio Rth(560)/d that is a ratio of the thickness-direction retardation Rth(560) at a wavelength of 560 nm relative to the thickness d, the change being a result of storage at a temperature of 60° C. and a humidity of 90% for 4 hours, is $0.5 \times 10^{-5}$ or less.

2. The optical film according to claim 1, wherein
an in-plane retardation Re(450) of the optical film at a wavelength of 450 nm, the in-plane retardation Re(560) of the optical film at a wavelength of 560 nm, and an in-plane retardation Re(650) of the optical film at a wavelength of 650 nm satisfy following formula (i) and formula (ii):

$$Re(450)/Re(560) < 1.0 \quad \text{(i), and}$$

$$Re(650)/Re(560) > 1.0 \quad \text{(ii).}$$

3. The optical film according to claim 1, comprising a polymer having an aromatic vinyl compound hydrogenated product unit (a) and a diene compound hydrogenated product unit (b).

4. The optical film according to claim 3, wherein
the polymer is a triblock copolymer including
one block B per molecule having the diene compound hydrogenated product unit (b),
one block A1 per molecule connected to one end of the block B and having the aromatic vinyl compound hydrogenated product unit (a), and
one block A2 per molecule connected to another end of the block B and having the aromatic vinyl compound hydrogenated product unit (a).

5. The optical film according to claim 4, wherein
in the triblock copolymer, a weight ratio (A1+A2)/B that is a ratio of a total of the block A1 and the block A2 relative to the block B is 70/30 or more and 90/10 or less, and
in the triblock copolymer, a weight ratio A1/A2 that is a ratio of the block A1 relative to the block A2 is 5 or more and 8 or less.

6. The optical film according to claim 3, wherein
the aromatic vinyl compound hydrogenated product unit (a) is a structural unit having a structure obtained by polymerizing and hydrogenating styrene, and
the diene compound hydrogenated product unit (b) is a structural unit having a structure obtained by polymerizing and hydrogenating isoprene.

7. The optical film according to claim 3, wherein
a weight-average molecular weight of the polymer is 50,000 or more and 80,000 or less, and
a molecular weight distribution of the polymer is 2 or less.

8. A polarizing plate comprising a polarizer and the optical film according to claim 1.

9. A method for producing the optical film according to claim 1, comprising
performing melt extrusion molding of a resin in a temperature range of 180° C. to 260° C., the resin containing a polymer having an aromatic vinyl compound hydrogenated product unit (a) and a diene compound hydrogenated product unit (b).

10. The method for producing the optical film according to claim 9, comprising stretching a pre-stretch film in a temperature range of 130° C. to 180° C. at a stretching ratio of 1.1 times to 2.5 times, the pre-stretch film being a film obtained by the melt extrusion molding.

* * * * *